United States Patent [19]

Seager

[11] Patent Number: 5,214,623
[45] Date of Patent: May 25, 1993

[54] WRISTWATCH RADIOTELEPHONE

[75] Inventor: Richard H. Seager, Mystic, Conn.

[73] Assignee: Timex Corporation, Middlebury, Conn.

[21] Appl. No.: 962,354

[22] Filed: Oct. 16, 1992

[51] Int. Cl.$^5$ .................. G04B 47/00; A44C 5/00
[52] U.S. Cl. .................. 368/10; 368/282; 224/165; 379/430
[58] Field of Search ........... 368/10, 281–282; 24/265 WS; 224/164–165, 174; 379/90, 428, 430, 433

[56] References Cited

U.S. PATENT DOCUMENTS

| | | | |
|---|---|---|---|
| 2,120,348 | 6/1938 | Bezault | 224/164 |
| 3,032,651 | 5/1962 | Gisiger-Stahl et al. | 250/14 |
| 4,608,786 | 9/1986 | Omoto et al. | 224/164 |
| 4,817,064 | 3/1989 | Milles | 368/282 |
| 4,821,532 | 4/1989 | Jaques et al. | 24/265 WS |
| 4,847,818 | 7/1989 | Olsen | 368/10 |
| 5,008,864 | 4/1991 | Yashitake | 368/10 |
| 5,054,051 | 10/1991 | Hoff | 379/56 |
| 5,152,693 | 10/1992 | Matsui et al. | 24/265 WS |

Primary Examiner—Vit W. Miska
Attorney, Agent, or Firm—Robert R. Jackson

[57] ABSTRACT

A combined wristwatch and radiotelephone has a plurality of substantially rigid link members disposed side by side in a series. Adjacent link members in the series are pivotally connected to one another about pivotal axes, all of which are substantially parallel to one another and to the longitudinal axis of the user's wrist when the apparatus is worn as a wristwatch. A main body member, which may contain or include such components as a display and a telephone dialing keypad, is disposed at an intermediate location in the series. An end member is disposed at each end of the series. One end member contains a radiotelephone microphone, and the other end member contains a radiotelephone speaker. A mechanism is associated with the series of link members for causing the link members to pivot relative to one another so that the apparatus can be placed in either a curved wristwatch configuration or a more elongated radiotelephone configuration.

13 Claims, 3 Drawing Sheets

WRISTWATCH RADIOTELEPHONE

BACKGROUND OF THE INVENTION

This invention relates to a combined wristwatch and radiotelephone, and more particularly to a wristwatch which can be converted temporarily to a form suitable for use as a hand-held radiotelephone.

Olsen U.S. Pat. No. 4,847,818 shows a wristwatch which can be removed from the user's wrist and temporarily reconfigured for use as a hand-held radiotelephone. The Olsen apparatus has many desirable features, but it would also be desirable to have a structure which forms a somewhat more definite, predetermined shape when reconfigured as a radiotelephone. This would tend to give the article a more substantial "feel" when used as a radiotelephone, thereby making the article more acceptable and attractive to at least some users.

In view of the foregoing, it is an object of this invention to provide a wristwatch radiotelephone which can be made to positively assume a definite shape of a first kind when configured for use as a wristwatch, and which can similarly be made to positively assume a definite shape of a second kind when configured for use as a radiotelephone.

SUMMARY OF THE INVENTION

This and other objects of the invention are accomplished in accordance with the principles of the invention by providing a wristwatch radiotelephone having a main body portion and a plurality of pivotally connected link members extending like a wristwatch band in opposite directions from the main body portion. A mechanism is provided for controlling the pivoting of the link members relative to one another so that the link members can be pivoted to collectively define either a curved shape when the apparatus is to be used as a wristwatch, or a more elongated shape when the apparatus is to be used as a radiotelephone. A radiotelephone microphone and a radiotelephone speaker are provided at respective opposite ends of the apparatus for simultaneous use adjacent the user's mouth and ear, respectively, when the apparatus is in the elongated radiotelephone configuration.

Further features of the invention, its nature and various advantages will be more apparent from the accompanying drawings and the following detailed description of the preferred embodiments.

BRIEF DESCRIPTION OF THE DRAWINGS

FIG. 1 shows the apparatus in the elongated, wristwatch configuration.

DETAILED DESCRIPTION OF THE PREFERRED EMBODIMENTS

Olsen U.S. Pat. No. 4,847,818, which is hereby incorporated by reference herein, shows all the electronic components and circuitry needed for a wristwatch radiotelephone. All of those same components and circuitry can be used in a wristwatch radiotelephone constructed in accordance with the present invention. Accordingly, it will not be necessary to repeat here any of the details regarding that portion of the apparatus.

Figure 1:
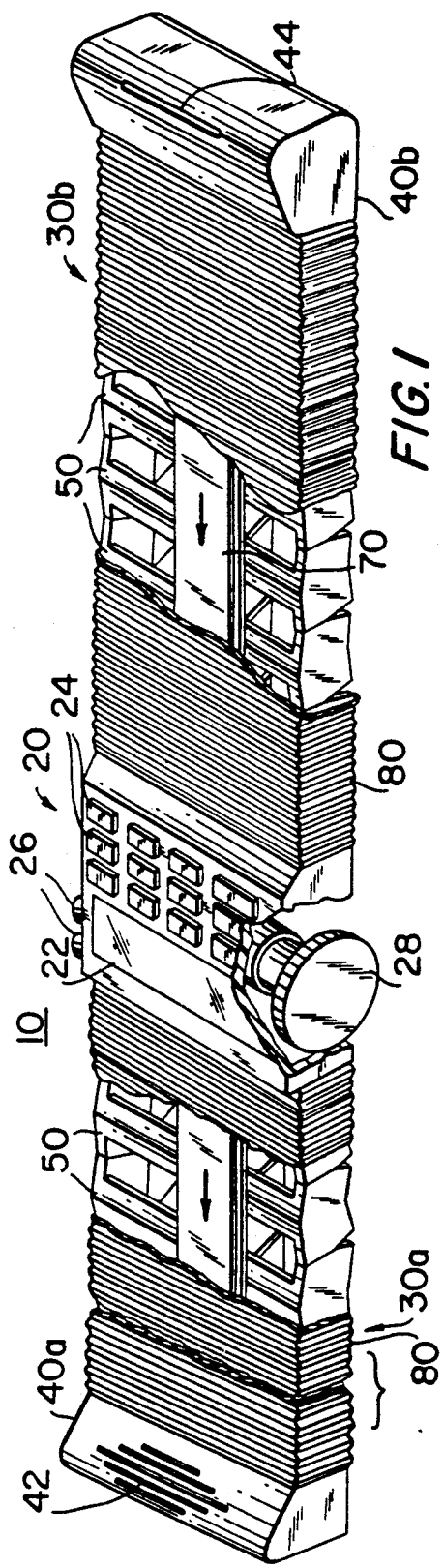
FIG. 1 is a simplified, partial, perspective view of an illustrative embodiment of a wristwatch radiotelephone constructed in accordance with the principles of this invention.
Figure 4:
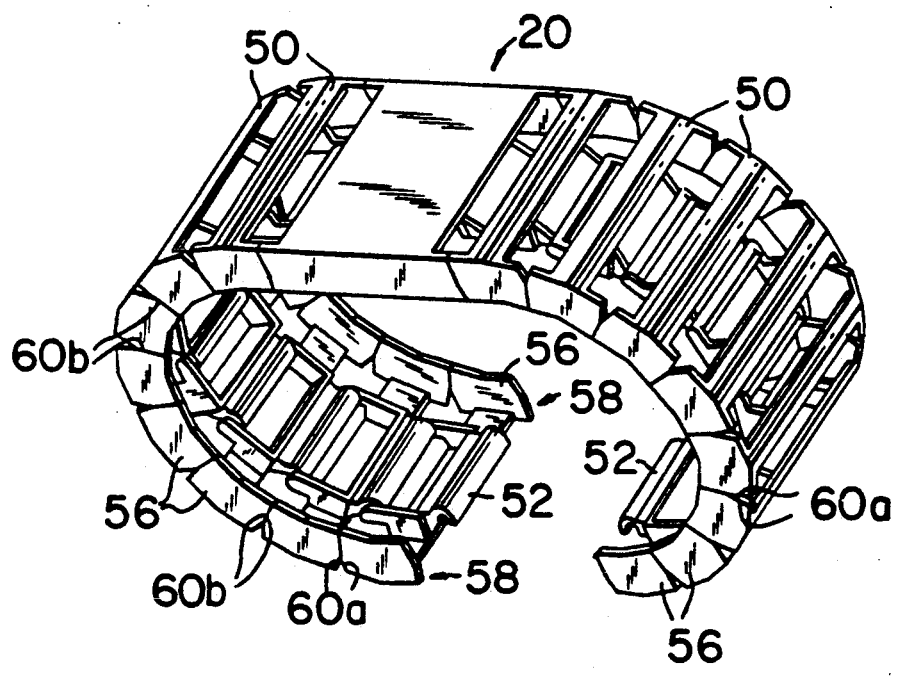
FIG. 4 is a view similar to FIG. 3 showing the apparatus in the carved, wristwatch configuration.
Figure 5:
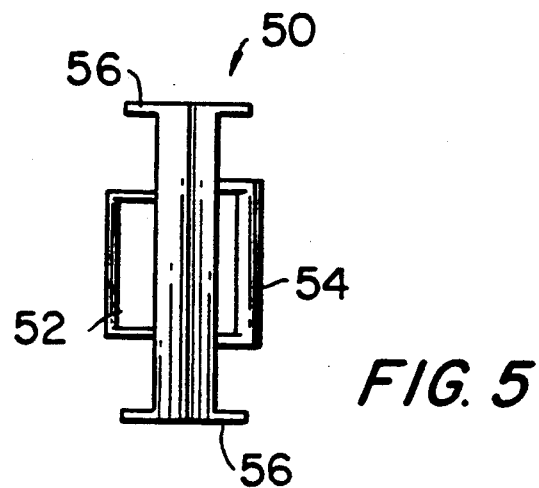
FIG. 5 is plan view of a single component of the type shown in FIGS. 3 and 4.
Figure 6:
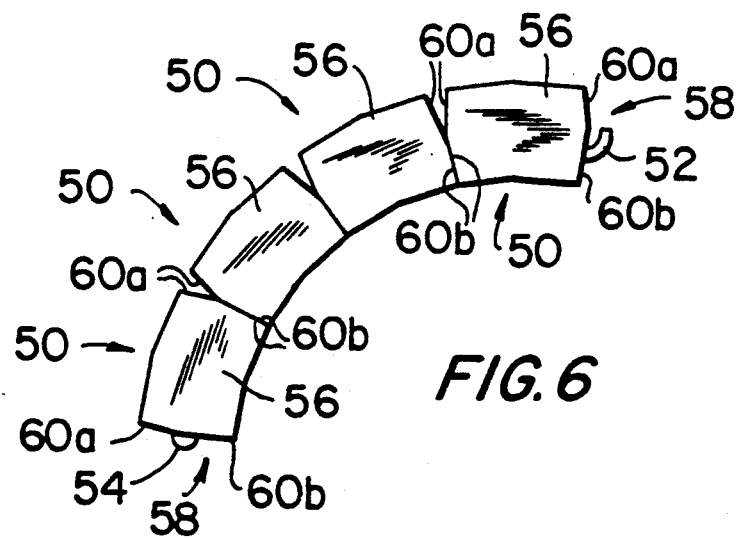
FIG. 6 is an elevational view of several adjacent components of the type shown in FIG. 5.

As shown in FIG. 1, a wristwatch radiotelephone 10 constructed in accordance with the principles of this invention includes a central main body portion 20 and elongated wristband portions 30a and 30b extending in opposite directions from main body portion 20. Main body portion 20 includes a display 22 which can be used to display the time, a telephone number, and/or other message information. Main body portion 20 also includes a telephone dialing keypad 24 (e.g., for allowing the user to enter a telephone number to be called when the apparatus is used as a radiotelephone). Additional push buttons 26 are provided on main body portion 20 for controlling the timekeeping and radiotelephone functions of the apparatus. Elements 22, 24, and 26 may be respectively similar to elements 10, 12, and 11 in the above-mentioned Olsen patent. Main body portion 20 also includes a mechanism (described in more detail below) for controlling whether wristband portions 30 are substantially flat and elongated as shown in FIG. 1 when the apparatus is to be used as a radiotelephone, or curved as shown in FIGS. 4 and 6 when the apparatus is to be worn on the wrist as a wristwatch. This mechanism is controlled by knob 28 which extends from one side of main body portion 20.

At the end of each wristband portion 30 remote from main body portion 20 is an end member 40a or 40b. End member 40a contains a radiotelephone speaker 42, while end member 40b contains a radiotelephone microphone 44. Elements 42 and 44 may be respectively similar to elements 8 and 6 in the above-mentioned Olsen patent. When apparatus 10 is in the elongated form shown in FIG. 1, the spacing between elements 42 and 44 is such that the apparatus can be held along one side of the user's face and speaker 42 will be adjacent the user's ear while microphone 44 is be simultaneously adjacent the user's mouth. This makes the apparatus suitable for convenient use as a radiotelephone.

When the above-mentioned mechanism in main body portion 20 is appropriately operated by knob 28, wristband portions 30 curve toward one another so that end members 40 approach one another opposite the back of main body portion 20. The apparatus then has a nearly closed C-shape (see FIG. 4) which fits snugly on the wrist of the user. This enables the apparatus to be worn as a wristwatch when it is not needed as a radiotelephone.

Considering now in more detail the construction and operation of wristband portions 30, FIGS. 1 and 3-6 show that the core components of the wristband portions are pivotally connected links 50. Each of wristband portions 30 includes a plurality of such links pivotally connected to one another side by side in a series extending from main body portion 20 to the associated end member 40. Each link 50 includes a hook 52 extending from one of its sides and a bar 54 extending along the opposite side remote from the hook. When links 50 are assembled in a series, the hook 52 of each link pivotally engages the bar 54 of the adjacent link in the series. In addition to pivotally connecting the links, hooks 52 cooperate with the end supports for the bars 54 to substantially prevent adjacent links from moving relative to one another parallel to the pivotal axes between the links.

Each link 50 also includes an end plate 56 at each end of the link. End plates 56 are substantially perpendicular to the axes about which links 50 are pivotally connected to one another as described above. When links 50 are assembled in a series, the adjacent side edges 58 of the plates 56 of adjacent links contact one another. Each side edge 58 has two portions 60a and 60b. Portions 60a of the two edges of a plate 56 are substantially parallel to one another. Portions 60b of the two edges of a plate 56 are inclined toward one another (synclinal) in the direction away from portions 60a. Portions 60a are closer to the outer surface of the apparatus when the apparatus is in the curved, wristwatch form. Portions 60b are closer to the inner surface of the apparatus when the apparatus is in the curved, wristwatch form. When the apparatus is in the elongated, radiotelephone form, portions 60a of adjacent links contact one another. When the apparatus is in the curved, wristwatch form, portions 60b of adjacent links contact one another. The pivotal axis about which two adjacent links pivot passes approximately through the knees (i.e., the points at which portions 60a and 60b meet) of the contacting edges of the two links. Accordingly, while elements 52 and 54 hold adjacent links 50 together, edges 58 keep the links properly spaced apart and also limit the amount by which adjacent links can pivot relative to one another. In particular, adjacent links 50 can only pivot between the relative positions in which portions 60a of the adjacent links contact one another, and the relative positions in which portions 60b of the adjacent links contact one another. As noted above, when portions 60a contact one another, the link structures are substantially straight and therefore adapted for radiotelephone use. When portions 60b contact one another, the link structures are curved as is required for wristwatch use.

Figure 2:
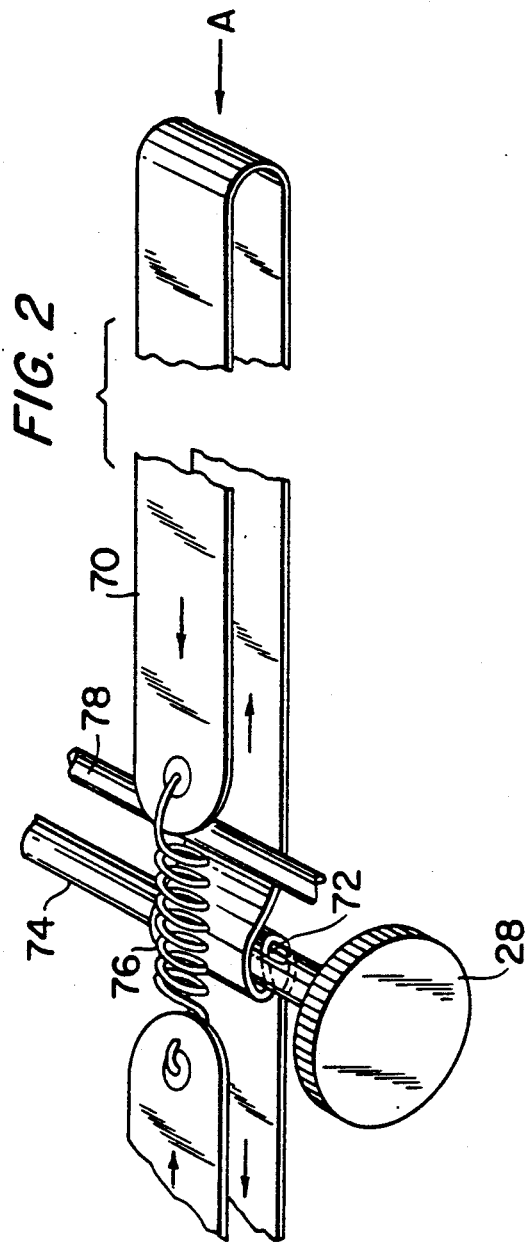
FIG. 2 is a simplified, partial, perspective view of certain internal components of the apparatus of FIG. 1.
Figure 3:
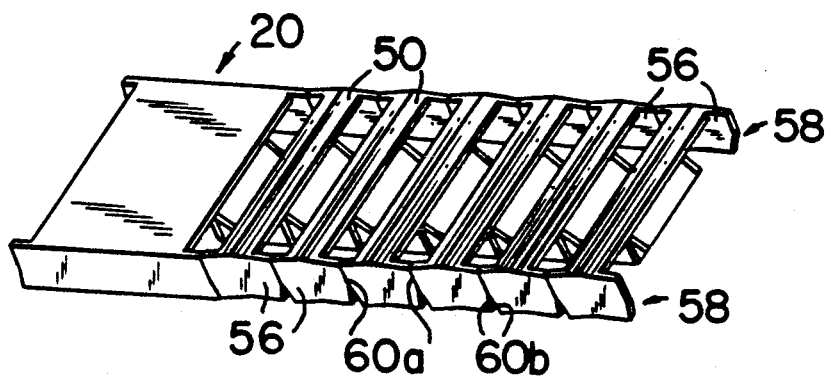
FIG. 3 is a simplified, partial, perspective view of other internal components of the apparatus of FIG. 1.

The mechanism which controls whether the link structures inside wristband portions 30 are straight or curved is shown in FIGS. 1 and 2. This mechanism includes a flexible tape 70 having a central portion which passes through a slot 72 in a shaft 74 that is rotatable by knob 28. The central portion of tape 70 is also wrapped about shaft 74 to some degree. From shaft 74 tape 70 extends along one side of the links inside each of wristband portions 30 and then back toward main body portion 20 along the other side of the link structures. In particular, from shaft 74 tape 70 first passes along the side of the links which is inside the curved wristwatch form of the apparatus. Tape 70 returns toward main body portion 20 along the side of the links which is outside the curved wristwatch form of the apparatus. The ends of tape 70 which are adjacent to main body portion 20 are joined to one another by prestressed tension coil spring 76. As an alternative to one spring 76 passing through main body portion 20, the ends of tape 70 could be connected by separate springs to the adjacent ends of main body portion 70. The portion of tape 70 which comes off the top of shaft 74 in FIG. 2 can be guided down toward the bottom of the associated links 50 by roller 78.

Although tape 70 passes along the sides of links 50 as described above, it is generally free to move parallel to its length relative to the links. Tape 70 is, however, attached to one link 50 at each end of its run (i.e., where tape 70 changes direction from extending away from main body 20 to extending toward main body 20). One such connection point is indicated at A in FIG. 2. Tape 70 is held against the sides of links 50 by a flexible plastic sheath 80 (FIG. 1) which covers links 50 and tape 70 on each of wristband portions 30.

When it is desired to cause apparatus 10 to assume the elongated radiotelephone configuration, knob 28 is turned to rotate shaft 74 in the clockwise direction as viewed in FIGS. 1 and 2. This unwraps some of tape 70 from shaft 74 and allows spring 76 to shorten. In effect, this increases the length of the tape on the inside surface of the curved wristwatch structure and shortens the length of the tape on the outside of that structure. This causes all of the pivotable connections between adjacent links to pivot from the condition in which edge portions 60b of adjacent links 50 contact one another to the condition in which edge portions 60a of adjacent links 50 contact one another. The apparatus therefore converts from the curved wristwatch form to the elongated radiotelephone form.

When it is desired to cause apparatus 10 to return from the elongated radiotelephone form to the curved wristwatch form, knob 28 is rotated in the counter-clockwise direction as viewed in FIGS. 1 and 2. This wraps some of tape 70 around shaft 74, which shortens the length of the tape running from shaft 74 to the tape attachment points (such as point A) near the ends of the apparatus. This causes adjacent links to pivot about their pivotal connections until the edge portions 60b of adjacent links come into contact with one another. Spring 76 extends to allow this pivoting of links 50 into the curved wristwatch form.

The above-described drive for tape 70 preferably includes a ratchet for holding elements 28 and 74 at least in whatever counter-clockwise position they are rotated to. In the clockwise direction a ratchet may not be required because when elements 28 and 74 are released from their counter-clockwise ratchet, spring 76 pulls the tape until stopped by adjacent surfaces 60b contacting one another. In the counter-clockwise direction, however, a ratchet is required to hold tape 70 against the pull of spring 76. Moreover, elements 28 and 74 may only be rotated in the counter-clockwise direction until the apparatus snugly grips the wrist, which will often occur before adjacent edge portions 60b contact one another (because the inclination of edge portions 60b is selected to allow the apparatus to curve to the degree required to grip the smallest wrist for which the apparatus is designed). The ratchet will then hold the apparatus in that wrist-engaging position. The above-described, releasable, one-way ratchet can be provided in any of several ways. For example, elements 28 and 74 can be shiftable parallel to the longitudinal axis of shaft 74 (like an ordinary watch stem) from a position in which the counter-clockwise ratchet is engaged to a position in which that ratchet is not engaged.

It will be understood that the foregoing is merely illustrative of the principles of this invention, and that various modifications can be made by those skilled in the art without departing from the scope and spirit of the invention. For example, although spring 76 is operative to place the apparatus in the elongated radiotelephone configuration when elements 28 and 74 are released to rotate clockwise, the roles of spring 76 and elements 28 and 74 could be reversed so that spring 76 is operative to place the apparatus in the curved condition when elements 28 and 74 are released to rotate. As another example of modifications within the scope of the invention, elements 22, 24, and 26 can be rearranged anywhere on the apparatus.

The Invention Claimed Is:

1. Apparatus which is convertible between a curved shape suitable for wearing around the wrist as a wristwatch and an elongated form suitable for use as a handheld radiotelephone with a microphone and a speaker adjacent respective opposite ends of said elongated form comprising:

a plurality of substantially rigid link members disposed side by side in a series, adjacent link members in said series being pivotally connected to one another, the pivotal axis of each pivotal connection being substantially parallel to the longitudinal axis of a user's wrist when the apparatus is worn on the wrist; and means for pivoting the link members connected by each pivotal connection between relative positions in which said link members collectively form said curved shape and relative positions in which said link members collectively form said elongated form.

2. The apparatus defined claims 1 further comprising:

means associated with each of said pivotal connections for limiting the pivoting of the link members connected by said pivotal connection so that pivoting of said link members toward the relative positions associated with said elongated form stops when said link members reach the relative positions associated with said elongated form.

3. The apparatus defined claim 2 wherein said means for limiting comprises:

stop surfaces on each of said link members, said stop surfaces on adjacent link members abutting one another when said link members reach the relative positions associated with said elongated form.

4. The apparatus defined in claim 1 further comprising:

means associated with each of said pivotal connections for limiting the pivoting of the link members connected by said pivotal connections so that pivoting of said link members toward the relative positions associated with said curved shape stops when said link members reach the relative positions associated with a predetermined curved shape.

5. The apparatus defined in claim 4 wherein said means for limiting comprises:

stop surfaces on each of said link members, said stop surfaces on adjacent link members abutting one another when said link members reach the relative positions associated with said predetermined curved shape.

6. The apparatus defined in claim 1 wherein said means for pivoting the link members comprises:

a first flexible member extending along at least a subplurality of adjacent link members in said series, said first flexible member being laterally spaced to a first side from the pivotal axes of the pivotal connections between the adjacent link members in said subplurality, and said first flexible member being anchored at points adjacent the link members at respective opposite ends of said subplurality; and means for changing the effective length of said first flexible member between the points at which said first flexible member is anchored.

7. The apparatus defined in claim 6 further comprising:

means for maintaining said first flexible member adjacent said subplurality of link members regardless of whether said apparatus is in said curved shape or said elongated form.

8. The apparatus defined in claim 7 wherein said means for maintaining comprises:

a flexible sheath surrounding said subplurality of link members and said first flexible member.

9. The apparatus defined in claim 6 wherein said means for pivoting the link members further comprises:

a second flexible member, which is also longitudinally resilient, extending along said subplurality of adjacent link members, said second flexible member being laterally spaced to a second side from the pivotal axes of the pivotal connections between the adjacent link members in said subplurality, and said second flexible member being anchored adjacent the points at which said first flexible member is anchored, said second flexible member being prestressed in tension so that it keeps said first flexible member in tension regardless of the effective length of said first flexible member.

10. The apparatus defined in claim 6 wherein said means for changing the effective length of said first flexible member comprises:

a rotatable shaft around which some of said first flexible member can be wound when it is desired to reduce the effective length of said first flexible member.

11. The apparatus defined in claim 1 further comprising:

a main body member intermediate said series of link members; and first and second end members adjacent respective opposite ends of said series.

12. The apparatus defined in claim 11 wherein said microphone is disposed in said first end member and said speaker is disposed in said second end member.

13. The apparatus defined in claim 12 further comprising:

display means, a telephone dialing keypad, and control buttons, all disposed in said main body member.

* * * * *